United States Patent Office 3,518,170
Patented June 30, 1970

3,518,170

ELECTRODEPOSITION OF IRON GROUP METALS

Herman Koretzky, Poughkeepsie, N.Y., assignor to International Business Machines Corporation, Armonk, N.Y., a corporation of New York No Drawing. Filed July 26, 1965, Ser. No. 474,991
Int. Cl. C23b 5/32, 5/04, 5/08
U.S. Cl. 204—43 15 Claims

ABSTRACT OF THE DISCLOSURE

An electrolyte and process for the deposition of iron group metals; i.e., iron, cobalt, and nickel and their alloys, with improved brightness and magnetic characteristics. The plating bath is formed by adding the reaction product of sulfamide with a carbonyl containing compound to a standard plating bath. The parameters of the bath are not critical. The process includes the step of electrolyzing a plating bath including an additive formed by the reaction of sulfamide with a carbonyl.

This invention relates to the electrodeposition of iron group metals. More particularly, it relates to a method of depositing iron group metals of enhanced brightness and improved magnetic characteristics. It also relates to improved electrolytic baths from which the iron group metals can be deposited.

As used herein, the term "iron group metals" includes iron, cobalt, and nickel and alloys of these metals.

Bright electrodeposited iron group metals are highly desirable and are extremely useful in many ways. Such metals are, of course, attractive and useful for functional and decorative finishing. Additionally, the lustre of a plated metal is a good indication of the quality of the surface which the metal possesses. Extreme brightness is indicative of a level, even uniform surface. Bright homogeneous finishes are highly desirable where a level surface is required, such as where friction is to be minimized or where resistance to corrosion is to be maximized.

Iron group metals are generally ferromagnetic in nature. Magnetic materials are utilized in some forms of electronic data processing equipment as memory elements, and in such devices it is important that the magnetic characteristics of the memories be both controllable and predictable. A plated magnetic memory element in the form of a tape, disc or drum should possess certain properties. The most frequently considered characteristic of a magnetic recording medium is its hysteresis loop. This is a graph of magnetic induction, B, in terms of the field strength, H. At high field the graph has a constant slope. The material is then said to be saturated and the magnetic induction reaches its maximum value $B_s$. The magnetic recording process is thus possible because the intensity of magnetization of the medium does not vanish when the applied field is reduced to zero. The intensity of magnetization remaining when the applied field is removed is called the remanance, or enhanced residual magnetization, $B_r \cdot B_r/B_s=1$; is indicative of a highly desirable square hysteresis loop. The field strength required to reduce the intensity of magnetization to zero is called the coercive force $H_c$. If a medium in the remanent condition is subjected to a small demagnetizing field which is then removed, the remanence will be reduced. The magnitude of the demagnetizing field can be successively increased until eventually a field is found, such that when the field is applied and then removed the remanence is reduced to zero. This demagnetizing field is known as the remanence-coercivity $H_r$, and is a more important parameter of a recording surface than coercivity. It is the smallest field which is required to reverse permanently the magnetization of the medium, and, thus, measures the ability of the medium to survive the temporary application of demagnetizing fields. The remanence-coercivity, of course, can never be less than the coercivity and may be considerably greater. In a recording medium both $H_r$ and $H_c$ should be as high as possible in order to make the medium resistent to demagnetizing effects. $H_r/H_c$ is also indicative of the shape of the hysteresis loop. $H_r/H_c=1$; is a high squareness hysteresis loop.

Memory elements may be produced by an electroplating operation. An element produced by such an operation should have the desirable magnetic characteristics described, although low coercivity materials are also useful as memory elements.

Electroplating is presently a highly developed art. Basic techniques, apparatus, and baths are well known. See for example: "Electroplating Engineering Handbook"; 2nd edition; Reinhold Publishing Corp. 1962. Within the art of these basic electroplating techniques and baths, numerous addition agents have been incorporated to obtain various plating objectives. Iron group metal brightening additives have been utilized and are known in the art. Additives for the control of magnetic properties are also known. There are, of course, additives which have a "dual-nature" in that they are capable of enhancing both the brightness and magnetic characteristics of plated iron group metals.

Perhaps the most widely used "dual-nature" prior art addition agent has been saccharin. This particular prior art addition agent has been widely utilized in electroplating baths to produce plated iron group metals having excellent brightness. Additionally, it has been found to be useful in the electrodeposition of iron group metals having good magnetic properties within limited ranges of coercivity. However, the results of using saccharin in the electrodeposition of cobalt-nickel magnetic alloys has been disappointing in the higher coercivity ranges. Saccharin has been found to enhance the magnetic properties of cobalt-nickel magnetic elements in the coercivity range of 150 to about 300 oersteds when electrodeposited in the presence of a large superimposed A.C. component. Surprisingly, films of cobalt-nickel having a coercive force in excess of 300 oersteds have quite erratic magnetic behavior. The addition of saccharin to a plating bath for the production of cobalt-nickel having a coercivity greater than 300 oersteds does not obviate this trouble.

Accordingly it is one object of this invention to provide improved electrolytic baths for use in the preparation of improved magnetic memory elements.

Another object of this invention is to teach new and improved electrolytic baths for use in the electrodeposition of bright iron group metals.

It is a specific object of this invention to provide a process for making a superior cobalt-nickel electroplated magnetic memory element.

Another object of the invention is to provide a process in which superior electroplating is brought about by the addition of certain chemical compounds to ordinary iron group plating solutions.

Another object of the invention is to provide an improved plating solution employing an additive which substantially improves the quality of the plated material.

A further object of the invention is to provide improved plating solution which provide improved qualities by the addition to ordinary electroplating baths of an additive selected from the reaction products of sulfamide with various carbonyl containing compounds.

The foregoing and other objects and advantages of the invention will be apparent from the following more particular description of preferred examples of the invention.

Briefly, this invention consists of the utilization of an improved class of addition agents in ordinary iron group electroplating baths. More specifically, the addition agents which have been discovered include the products of reacting sulfamide with various carbonyl containing compounds. The specific carbonyl containing compounds are 2,4-pentanedione, 2,3-butanedione, 4-oxopentanoic acid, 2,5,8-nonanetrione, 1,4-cyclohexadienedione, 2-propanone and methyl glyoxal.

While the exact reaction and resulting reaction product in each of the reactions producing the addition agents is not known with complete certainty, the apparent reactions and molar ratios of the carbonyl containing compounds to sulfamide are shown below along with the expected reaction product. It will be readily observable from the predicted reaction structures that the chemical nature of the reaction products encourages tautomerism. Because of this, the reaction product may take several forms, thus adding to the confusion as to the exact reaction product structure.

out by the addition of a small amount of sodium hydroxide to the reaction mixture, while acid catalysis is carried out by the introduction of dry gaseous hydrogen chloride to the reaction mixture. In each reaction, the specific carbonyl containing compound and sulfamide in the necessary molar relationship are introduced into a flask containing ethanol or ethanol and water. The acid or alkaline catalyst is then introduced and the entire system is heated under reflux for about one hour. Upon completion of the reaction, the reaction product is crystallized by evaporating the solvents under reduced pressure and the reaction product crystals are dissolved in a small amount of water. This solution is then adjusted to a pH of about 4.0 by the addition of sulfuric acid to the solution and the solution diluted with sufficient water to prepare a 1 molar solution of the expected reaction product. The reaction product can then be added to an electroplating bath in any desired quantity by the addition of a known volume of the standard solution.

REACTIONS WHICH PRODUCE ELECTROPLATING ADDITION AGENTS

| Reaction and Molar Ratio of Carbonyl Containing Compound to Sulfamide | Carbonyl Containing Compound Structures | Probable Reaction Products |
|---|---|---|
| Reaction of 1 mole of 2,4-pentanedione with 1 mole of sulfamide | 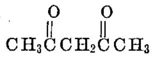 | 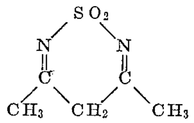 |
| Reaction of 1 mole of 2,3-butanedione with 1 mole of sulfamide | 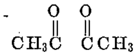 | 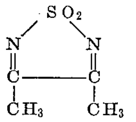 |
| Reaction of 2 moles of 4-oxopentanoic acid with 1 mole of sulfamide | 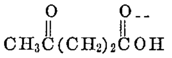 | 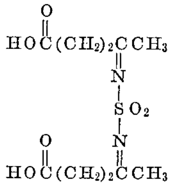 |
| Reaction of 2 moles of 2,5,8-nonanetrione with 3 moles of sulfamide | 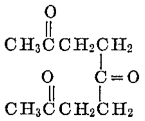 | 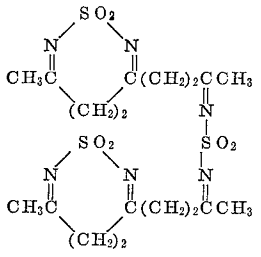 or $(C_{18}H_{28}N_6O_6S_3)_n$ where $n$ is an integer |
| Reaction of 1 mole of 1,4-cyclohexadienedione with 1 mole of sulfamide | 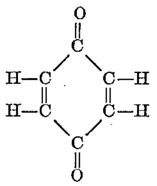 | 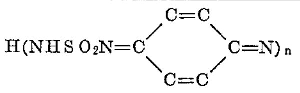 where $n$ is an integer |
| Reaction of 2 moles of 2-propanone with 1 mole of sulfamide | 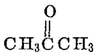 | $(CH_3)_2C{=}NSO_2N{=}C(CH_3)_2$ |
| Reaction of 2 moles of methyl glyoxal with 1 mole of sulfamide | 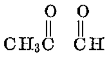 | 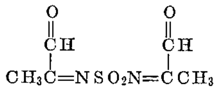 |

The above reactions can be carried out under either alkaline or acid catalysis. Alkaline catalysis is carried The 2,5,8-nonanetrione was prepared by pyrolysis of calcium levulinate. 4-oxopentanoic acid was heated with calcium carbonate and heated gently to drive off the water which had formed. The dry calcium salt was then strongly heated and the 2,5,8-nonanetrione collected as a distillate under reduced pressure. The reactions are as follows:

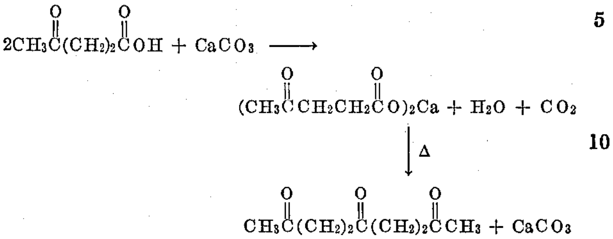

Other unique polyketones can be prepared similarly by reacting other alkaline earth metal salts with various organic acids, such as with 2-ketopropionic acid, to produce 2,3,4-pentanetrione, or with 3-ketobutyric acid to produce 2,4,6-heptanetrione.

Following the various procedures detailed above, the addition agents of the present invention can be easily produced by a person having skill in the art.

The process of the present invention for electrodepositing iron group metals includes the step of electrolyzing a solution containing iron group metal ions and an additive which is the reaction product of sulfamide and the various carbonyl containing compounds as indicated above.

The following descriptions, specific examples, and representative baths will detail and describe the method and compositions utilized in electrodepositing iron group metals. They are set forth as preferred embodiments and are not intended to limit the scope of the invention.

EXAMPLE 1

Cobalt-nickel alloy was electrodeposited from the following bath, hereinafter referred to as bath "A," and under the indicated conditions:

$CoSO.7H_2O$—60 gm./l.
$NiSO_4.6H_2O$—40 gm./l.
$NH_4Cl$—70 gm./l.
$NaH_2PO_2.H_2O$—0.75 gm./l.
Reaction product of sulfamide with 2,4-pentanedione—1.8 gm./l.
Temperature—55° C.
pH—3.0
Agitation—Moderate
Anode—Cobalt
Cathode—Polyethylene terephthalate film plated with electroless nickel.

The cathode, a continuous 2-inch wide web, was moved into and out of the plating solution around an idle roller at a rate of 6 inches per minute with external electrical contact. The current used was maintained at 0.75 ampere per inch of cathode web width, or 1.5 amperes for this example.

The resulting electrodeposited cobalt-nickel alloy was fully brilliant with no dull or cloudy areas present.

Electroplating was then carried out using two similar baths varied in that in one bath, hereinafter referred to as bath "B," no additive at all was used while in the second bath, hereinafter referred to as bath "C," saccharin was the only additive used. The resulting electrodeposited cobalt-nickel alloy from bath B was bright and in some places brilliant, but it also had some cloudy areas. The saccharin containing bath C yielded fully brilliant cobalt-nickel alloy.

The magnetic characteristics of the plated materials were determined by making a study of five randomly selected spots taken from each plated substrate. The following tables are indicative of the magnetic characteristics discovered for each of the cobalt-nickel plating baths at each of the five randomly selected spots. A detailed statistical evaluation of this information is also given. The values for $H_c$ and $H_r$ are given in terms of oersteds.

MAGNETIC PROPERTIES OF Co-Ni ELECTRODEPOSITED FROM VARIOUS BATHS

| | Spot 1 | | | Spot 2 | | | Spot 3 | | | Spot 4 | | | Spot 5 | | |
|---|---|---|---|---|---|---|---|---|---|---|---|---|---|---|---|
| | $H_c$ | $H_r$ | $H_r/H_c$ | $H_c$ | $H_r$ | $H_r/H_c$ | $H_c$ | $H_r$ | $H_r/H_c$ | $H_c$ | $H_r$ | $H_r/H_c$ | $H_r$ | $H_r$ | $H_r/H_c$ |
| Bath: | | | | | | | | | | | | | | | |
| A | 630 | 660 | 1.05 | 650 | 660 | 1.02 | 620 | 660 | 1.06 | 660 | 660 | 1.00 | 715 | 725 | 1.01 |
| B | 670 | 740 | 1.10 | 630 | 740 | 1.18 | 360 | 680 | 1.89 | 785 | 900 | 1.15 | 910 | 920 | 1.01 |
| C | 600 | 800 | 1.33 | 455 | 525 | 1.16 | 750 | 815 | 1.09 | 660 | 670 | 1.02 | 850 | 850 | 1.00 |

STATISTICAL ANALYSIS OF MAGNETIC PROPERTIES OF Co-Ni ELECTRODEPOSITED FROM VARIOUS ELECTROLYTES

| Magnetic Property | Bath | Mean | Average Deviation | Range | Standard Deviation | Percent Standard Deviation [1] |
|---|---|---|---|---|---|---|
| Coercivity $H_c$ | A | 655 | 26 | 95 | 37 | 5.7 |
| | B | 671 | 141 | 550 | 206 | 30.7 |
| | C | 663 | 110 | 395 | 158 | 23.8 |
| Remenance-Coercivity, $H_r$ | A | 673 | 21 | 65 | 29 | 4.3 |
| | B | 796 | 90 | 240 | 107 | 13.5 |
| | C | 732 | 108 | 325 | 134 | 18.3 |
| $H_r/H_c$ | A | 1.03 | 0.022 | 0.06 | 0.08 | 7.7 |
| | B | 1.27 | 0.252 | 0.88 | 0.35 | 27.6 |
| | C | 1.12 | 0.888 | 0.33 | 0.12 | 10.5 |

[1] As used herein: Percent Standard Deviation=Standard deviation×100/mean.

From this data it is seen that while all of the plated alloy samples had a mean coercivity on the same order, there were in fact marked deviations in the coercivity and the $H_r/H_c$ from spot to spot on the samples deposited from baths B and C. In sharp contrast to this, the magnetic characteristics of the material plated from the bath containing the reaction product of sulfamide with 2,4-pentanedione is not magnetically erratic. Additionally, the value for $H_r/H_c$ for the material plated from the bath containing the additive of the present invention is 1.03 and since $H_r/H_c$ of 1.00 is indicative of a highly desirable square hysteresis loop, this indicates a nearly square hysteresis loop.

The above process and composition of the present invention can of course be utilized in producing magnetic tapes in a manner similar to that described in Wenner, U.S. Pat. 3,150,939 and U.S. patent application S.N. 165,806, now U.S. Pat. 3,227,635, both of which are assigned to the assignee of the present application.

EXAMPLE 2

Nickel was electrodeposited from the following Watt's bath and under the indicated conditions:

$NiSO_4.6H_2O$—300 gm./l.
$NiCl_2.6H_2O$—45 gm./l.

$H_3BO_3$—41 gm./l.
Sodium diamyl sulfosuccinate—0.05 gm./l.
Reaction product of sulfamide with 2,4-pentanedione—1.80 gm./l.
Temperature—60° C.
ph—4.0
Agitation—Moderate
Anode—Nickel
Cathode—Polished brass panel
Current density—60 a.s.f.
Time—20 minutes.

As is common practice, the anode was bagged with cotton to prevent the contamination of the electrolyte with sludge formed due to the corrosion of the nickel anode. The sodium diamyl sulfosuccinate was utilized as a wetting agent to reduce the interfacial tension so as to prevent pitting of the electrodeposited material due to bubbles adhering to the cathode. The resulting electrodeposited nickel was fully bright over the entire panel and sufficiently ductile so that no cracking was detected on bending the panel 180°.

Electrodeposition was carried out using a similar bath which had no additive present. The resulting deposit was dull, gray and columnar.

EXAMPLE 3

An electroplating bath was prepared as in Example 2 with the addition of 0.02 gm./l. of 2-butyne-1,4-diol as a secondary nickel brightener. The resulting electrodeposited nickel was completely brilliant over the entire panel. In addition, the nickel was level, ductile and possessed excellent adhesion to the substrate.

EXAMPLE 4

Nickel-iron alloy was deposited from the following bath and under the following conditions:

$NiCl_2.6H_2O$—200 gm./l.
$FeCl_2.4H_2O$—3 gm./l.
$H_3BO_3$—25 gm./l.
Sodium lauryl sulfate—0.4 gm./l.
Reaction product of sulfamide with 2,4-pentanedione—1.6 gm./l.
Temperature—25° C.
pH—3.0
Agitation—Moderate
Anode—Nickel
Cathode—Copper foil
Current density—20 ma./cm.$^2$
External magnetic field—50 oe.

The resulting plated nickel-iron alloy was very bright and had a coercivity of 6.1 oersteds, while the $B_r/B_s$ was 0.99 indicating an almost perfect square hysteresis loop.

In two similar baths, one without additive and one with saccharine as the additive, the plated iron-nickel alloy had a coercivity 5.4 and 5.9 oersteds respectively, and $B_r/B_s$ of 0.95 and 0.98 respectively.

EXAMPLE 5

An electroplating bath was prepared as in Example 4 using 16 gm./l. of the additive. The resulting plated nickel-iron was very bright and had a coercivity of 6.4 and a $B_r/B_s$ of 0.96.

EXAMPLE 6

An electroplating bath was prepared as in Example 4 but using 1.3 gm./l. of the reaction product of sulfamide with 2,3-butanedione as the additive. The coercivity of the bright plated iron-nickel was 6.0 oersteds and the $B_r/B_s$ was 0.96. Thicker films will exhibit lower coercivities; but the squareness ratio will still closely approximate one.

It will be understood that these examples are merely illustrative and are not to be taken as limitations of the invention, it being understood that, in general, the present invention may be utilized in connection with any iron group metal electroplating bath. The bath parameters are generally not a limiting factor.

While the invention has been particularly described and shown with reference to preferred examples disclosing the the use of the reaction products of sulfamide with 2,4-pentanedione and 2,3-butanedione, it will be understood by those skilled in the art that the other additives which have been disclosed may be substituted therefor without departing from the spirit and the scope of the invention.

What is claimed is:

1. An aqueous acidic bath for electroplating iron group metals containing:

at least one iron group metal salt; and an effective amount, sufficient to provide a deposit of improved brightness and magnetic character, of an additive selected from the group consisting of the reaction products of one mole of sulfamide with one mole of 2,4-pentanedione, one mole of sulfamide with one mole of 2,3-butanedione, one mole of sulfamide with two moles of 4-oxopentanoic acid, three moles of sulfamide with two moles of 2,5,8-nonanetrione, one mole of sulfamide with one mole of 1,4-cyclohexadienedione, one mole of sulfamide with two moles of 2-propanone, and one mole of sulfamide with two moles of methyl glyoxal; said reaction products produced by heating said reactants in combination under reflux conditions.

2. The bath of claim 1 wherein the iron group metal salt contains nickel ions.

3. The bath of claim 1 wherein the iron group metal salt contains nickel and cobalt ions.

4. The bath of claim 1 wherein the iron group metal salt contains nickel and iron ions.

5. The bath of claim 1 wherein the additive is the reaction product of sulfamide with 2,4-pentanedione.

6. The bath of claim 1 wherein the additive is the reaction product of sulfamide with 2,3-butanedione.

7. The process of electrodepositing iron group metals including the step of:

electrolyzing an aqueous acidic bath containing at least one iron group metal salt and, an effective amount, sufficient to provide a deposit of improved brightness and magnetic character, of an additive selected from the group consisting of the reaction products of one mole of sulfamide with one mole of 2,4-pentanedione, one mole of sulfamide with one mole of 2,3-butanedione, one mole of sulfamide with two moles of 4-oxopentanoic acid, three moles of sulfamide with two moles of 2,5,8-nonanetrione, one mole of sulfamide with one mole of 1,4-cyclohexadienedione, one mole of sulfamide with two moles of 2-propanone, and one mole of sulfamide with two moles of methyl glyoxal; said reaction products produced by heating said reactants in combination under reflux conditions.

8. The process of claim 7 wherein the iron group metal salt includes nickel ions.

9. The process of claim 7 wherein the iron group metal salt includes nickel and cobalt ions.

10. The process of claim 7 wherein the iron group metal salt includes nickel and iron ions.

11. The process of claim 7 wherein the additive is the reaction product of sulfamide with 2,4-pentanedione.

12. The process of claim 7 wherein the additive is the reaction product of sulfamide with 2,3-butanedione.

13. The process of electrodepositing nickel including the step of:

electrolyzing an aqueous acidic bath containing nickel salt, an effective amount, sufficient to provide a deposit of improved magnetic character and serve as a primary brightness improver, of an additive selected from the group consisting of the reaction products of one mole of sulfamide with one mole of 2,4-pentanedione, one mole of sulfamide with one mole of 2,3-butanedione, one mole of sulfamide with two moles of 4-oxopentanoic acid, three moles of sulfamide with two moles of 2,5,8-nonanetrione, one mole of sulfamide with one mole of 1,4-cyclohexadienedione, one mole of sulfamide with two moles of 2-propanone, and one mole of sulfamide with two moles of methyl glyoxal, and a secondary brightening additive; said reaction products produced by heating said reactions in combination under reflux conditions.

14. The process of producing magnetic memory elements including the step of:

electrodepositing cobalt-nickel alloy on a flexible conductive substrate by electrolyzing the substrate in an aqueous acidic bath containing salts of cobalt and nickel and an effective amount, sufficient to provide a deposit of improved brightness and magnetic character, of an additive selected from the group consisting of the reaction products of one mole of sulfamide with one mole of 2,4-pentanedione, one mole of sulfamide with one mole of 2,3-butanedione, one mole of sulfamide with two moles of 4-oxopentanoic acid, three moles of sulfamide with two moles of 2,5,8-nonanetrione, one mole of sulfamide with one mole of 1,4-cyclohexadienedione, one mole of sulfamide with two moles of 2-propanone, and one mole of sulfamide with two moles of methyl glyoxal; said reaction products produced by heating said reactants in combination under reflux conditions.

15. The process of producing magnetic memory elements including the step of:

electrodepositing nickel-iron alloy on a conductive substrate by electrolyzing the substrate in an aqueous acidic bath containing salts of cobalt and nickel and, an effective amount, sufficient to provide a deposit of improved brightness and magnetic character, of an addititive selected from the group consisting of the reaction products of one mole of sulfamide with one mole of 2,4-pentanedione, one mole of sulfamide with one mole of 2,3-butanedione, one mole of sulfamide with two moles of 4-oxopentanoic acid, three moles of sulfamide with two moles of 2,5,8-nonanetrione, one mole of sulfamide with one mole of 1,4-cyclohexadienedione, one mole of sulfamide with two moles of 2-propanone, and one mole of sulfamide with two moles of methyl glyoxal; said reaction products produced by heating said reactants in combination under reflux conditions.

References Cited

UNITED STATES PATENTS

| | | | |
|---|---|---|---|
| 2,454,262 | 11/1948 | Walter | 260—243 |
| 2,473,042 | 6/1949 | Walter | 260—243 |
| 2,809,156 | 10/1957 | Safranek | 204—43 |
| 2,848,392 | 8/1958 | Ford et al. | 204—49 |
| 2,972,571 | 2/1961 | Towle | 204—49 |
| 3,041,336 | 6/1962 | Teufel | 260—243 |
| 3,201,396 | 8/1965 | Wright | 260—243 |
| 3,203,954 | 8/1965 | Wright | 260—243 |
| 3,223,703 | 12/1965 | Wright | 260—243 |
| 3,278,532 | 10/1966 | Houlihan | 260—243 |
| 3,306,831 | 2/1967 | Cope | 204—43 |
| 3,401,097 | 9/1968 | Merker et al. | 204—49 |

JOHN H. MACK, Primary Examiner
G. L. KAPLAN, Assistant Examiner

U.S. Cl. X.R.

204—48, 49